(12) United States Patent
Hennessey et al.

(10) Patent No.: US 11,840,136 B2
(45) Date of Patent: Dec. 12, 2023

(54) STRUCTURAL ASSEMBLY AND VEHICLE HAVING STRUCTURAL ASSEMBLY

(71) Applicant: Ford Global Technologies, LLC, Dearborn, MI (US)

(72) Inventors: Conor Daniel Hennessey, South Hadley, MA (US); Vladimir Vladimirovich Bogachuk, West Bloomfield, MI (US); Shawn Michael Morgans, Chelsea, MI (US); Stephen William Gallagher, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 76 days.

(21) Appl. No.: 17/531,189

(22) Filed: Nov. 19, 2021

(65) Prior Publication Data

US 2023/0158876 A1     May 25, 2023

(51) Int. Cl.
  *B60K 1/04*     (2019.01)
  *B62D 21/11*    (2006.01)
  *B62D 27/04*    (2006.01)
  *B62D 29/00*    (2006.01)

(52) U.S. Cl.
  CPC ............... *B60K 1/04* (2013.01); *B62D 21/11* (2013.01); *B62D 27/04* (2013.01); *B62D 29/007* (2013.01); *B60K 2001/0438* (2013.01)

(58) Field of Classification Search
  CPC .. B60K 1/04; B60K 2001/0438; B62D 21/11; B62D 27/04
  See application file for complete search history.

(56) References Cited

U.S. PATENT DOCUMENTS

| | | | |
|---|---|---|---|
| 3,881,767 A * | 5/1975 | Klees | B60G 99/004 |
| | | | 293/30 |
| 7,481,485 B2 | 1/2009 | Ma et al. | |
| 10,155,542 B2 | 12/2018 | Gao et al. | |
| 10,875,582 B2 | 12/2020 | Tsuyuzaki et al. | |
| 11,088,412 B2 * | 8/2021 | Matecki | H01M 50/204 |

FOREIGN PATENT DOCUMENTS

WO     2019234319     12/2019

\* cited by examiner

*Primary Examiner* — Jason D Shanske
*Assistant Examiner* — James J Triggs
(74) *Attorney, Agent, or Firm* — Burris Law, PLLC

(57) ABSTRACT

A structural assembly for a vehicle includes a battery structure having a battery frame. The structural assembly includes a vehicle frame and a vehicle body. The vehicle frame has opposed longitudinal rails. The vehicle body is separate from and mounted on the vehicle frame. The vehicle body includes opposed rockers extending in a longitudinal direction of the vehicle. Each opposed longitudinal rail is located between a respective rocker and the battery frame of the battery structure.

18 Claims, 6 Drawing Sheets

STRUCTURAL ASSEMBLY AND VEHICLE HAVING STRUCTURAL ASSEMBLY

FIELD

The present disclosure relates to a structural assembly and a vehicle having a structural assembly.

BACKGROUND

The statements in this section merely provide background information related to the present disclosure and may not constitute prior art.

The desire to reduce automotive fuel consumption and emissions has been well documented. Thus, electric vehicles have been developed to significantly reduce reliance on internal combustion engines. In general, electric vehicles differ from conventional motor vehicles because they are driven by one or more rechargeable battery packs having lithium-ion batteries, for example, or any other suitable electrical power storage units. The battery pack typically powers one or more motors to drive a set of wheels. The size and weight of the battery pack is typically greater for electric vehicles capable of traveling long distances (e.g., electric vehicles capable of traveling more than 500 miles). Depending on the mounting location relative to the electric vehicle, the battery pack may be susceptible to various vehicle loads.

Integration of rechargeable battery packs into the structure of existing vehicles and providing efficient load paths in a variety of operating conditions can be challenging, primarily due to the increased weight of the battery packs and their larger footprint in the vehicle. The present disclosure addresses these issues related to the integration of rechargeable battery packs in electric vehicles.

SUMMARY

This section provides a general summary of the disclosure and is not a comprehensive disclosure of its full scope or all of its features.

In one form, the present disclosure discloses a structural assembly for a vehicle that includes a battery structure having a battery frame. The structural assembly comprises a vehicle frame and a vehicle body. The vehicle frame has opposed longitudinal rails. The vehicle body is separate from and mounted on the vehicle frame. The vehicle body includes opposed rockers extending in a longitudinal direction of the vehicle. Each opposed longitudinal rail is located between a respective rocker and the battery frame of the battery structure.

In variations of the structural assembly of the above paragraph, which may be implemented individually or in any combination: the rockers overlap the opposed longitudinal rails; the opposed longitudinal rails are spaced apart from the respective rocker by a predetermined distance; the predetermined distance is less than or equal to 19 millimeters; a plurality of mounts are secured to a respective opposed longitudinal rail and a jounce bumper is disposed on a respective mount and between the respective mount and the vehicle body; a vehicle suspension system is secured to the vehicle frame and a wheel of the vehicle; the vehicle body includes cross members extending above the opposed longitudinal rails and the battery structure; the vehicle frame is made of steel; the vehicle frame does not include cross members at or near a center portion of the vehicle frame; and the opposed longitudinal rails are spaced apart from a respective side of the battery frame.

In another form, the present disclosure discloses an electric vehicle that comprises a battery structure, a vehicle frame, a vehicle suspension system, and a vehicle body. The battery structure has a battery frame. The vehicle frame has opposed longitudinal rails. The vehicle suspension system is secured to the vehicle frame and a respective wheel of the vehicle. The vehicle body is separate from and mounted on the vehicle frame. The vehicle body does not include cross members at or near a center portion thereof and includes opposed rockers extending in a longitudinal direction of the vehicle. Each opposed longitudinal rail is located between a respective rocker and the battery frame of the battery structure. The rockers overlap the opposed longitudinal rails.

In variations of the structural assembly of the above paragraph, which may be implemented individually or in any combination: the vehicle frame is made of steel.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
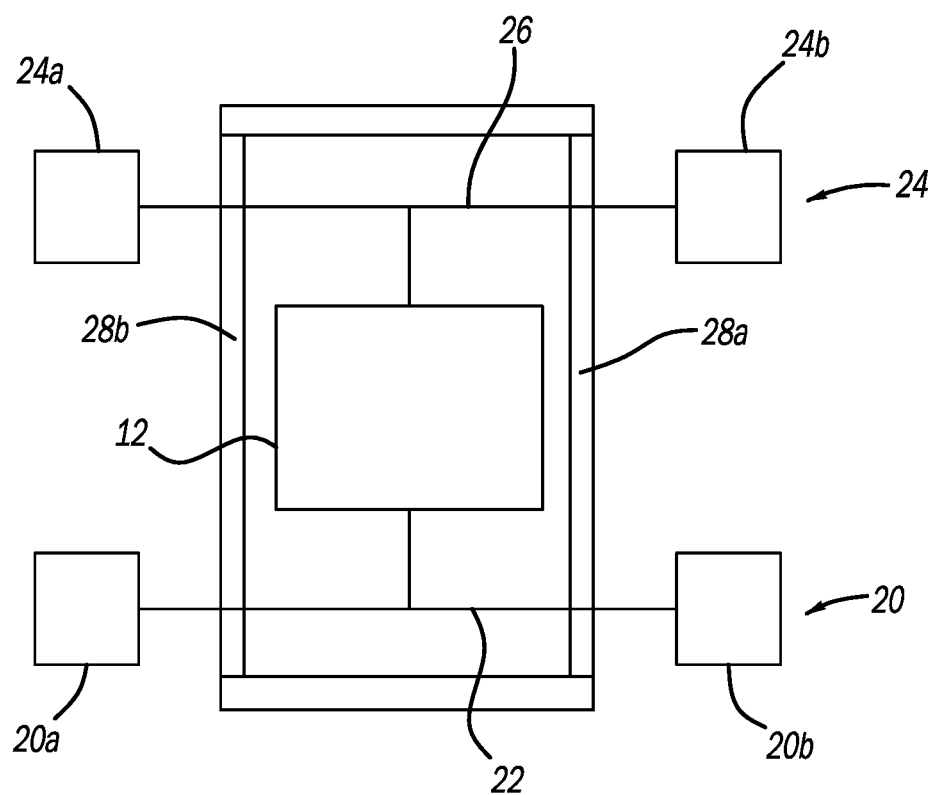
FIG. 1 is a schematic view of a vehicle including a structural assembly according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIGS. 1-4, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle. The vehicle 10 includes a battery structure 12 (FIGS. 2 and 3), a vehicle frame 14 and a vehicle body 16. The battery structure 12 may be rechargeable and may include lithium-ion batteries, solid-state batteries, or any other suitable electrical power storage units. The battery structure 12 may be disposed at various locations of the vehicle 10 and may be secured to the vehicle frame 14 via a battery pack support assembly 17. In this way, the battery structure 12 is supported by the vehicle frame 14 and is remote from a passenger cabin (not shown) and cargo compartments (not shown) of the vehicle 10, therefore, not occupying space that would otherwise be available for passengers or cargo. The battery structure 12 includes an outer support frame 18. The battery structure 12 powers a rear motor (not shown) to drive rear wheels 20a, 20b of a set of rear wheels 20 via a rear axle 22. Similarly, the battery structure 12 powers a front motor (not shown) to drive front wheels 24a, 24b of a set of front wheels 24 via a front axle 26.

Figure 5:
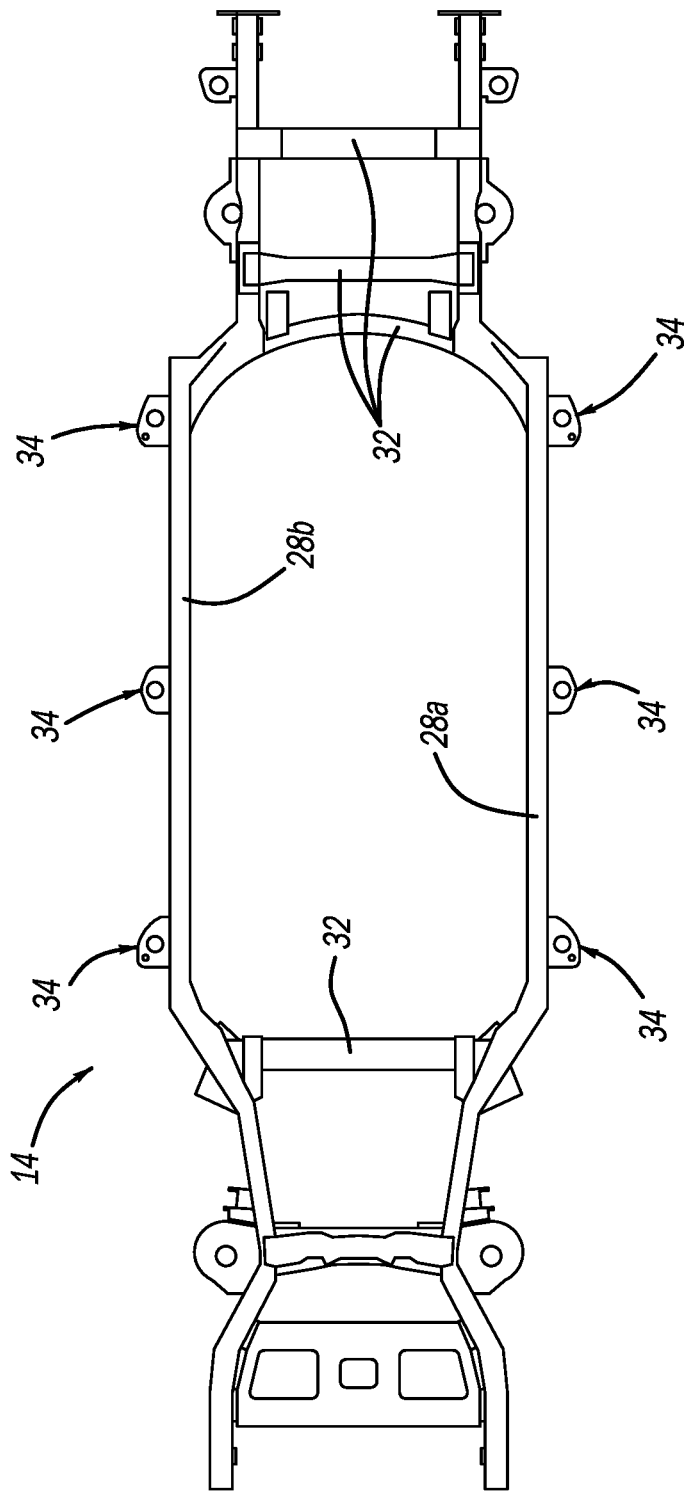
FIG. 5 is a bottom view of the vehicle frame of the vehicle of FIG. 1.

With additional reference to FIG. 5, the vehicle frame 14 is made of a metal material such as steel, for example, and is the main supporting structure of the vehicle 10, to which various components are attached either directly or indirectly. For example, a suspension system 30 (FIG. 4) is secured to the vehicle frame 14, and secures the wheels 20, 24 of the vehicle 10 to the vehicle frame 14. The suspension system 30 provides a smooth ride by absorbing energy from various road bumps while driving, and assists the wheels 20, 24 to remain in contact with the road by increasing wheel friction. The suspension system 30 includes various components such as upper and lower control arms, shock absorbers, and ball joints, for example.

The vehicle frame 14 includes opposed longitudinal rails 28a, 28b and cross members 32. The rails 28a, 28b are spaced apart from each other and may establish a length of the vehicle frame 14. The rails 28a, 28b are also spaced apart from a respective side 33 of the outer support frame 18. In this way, components such as electrical conduits, for example, may extend along and between the outer support frame 18 and the rails 28a, 28b. The cross members 32 connect the rails 28a, 28b to each other. The suspension system 30 may be secured to the rails 28a, 28b and/or the cross members 32. It should be understood that the vehicle frame 14 does not include cross members at or near a center portion thereof to accommodate the battery structure 12. It should also be understood that the rails 28a, 28b are spaced apart a greater distance at the center portion of the vehicle frame 14 than at the ends of the vehicle frame 14. A plurality of mounts 34 are secured to and along a respective rail 28a, 28b of the vehicle frame 14 at or near the center portion of the vehicle frame 14.

The vehicle body 16 is separate from and mounted on the vehicle frame 14. Stated differently, the vehicle body 16 is mounted on the plurality of mounts 34 secured to the vehicle frame 14. Jounce bumpers are disposed on a respective mount 34 and between the respective mount 34 and the vehicle body 16. The vehicle body 16 includes cross members 35 (FIGS. 2 and 3) extending above the opposed longitudinal rails 28a, 28b and the battery structure 12.

Figure 2:
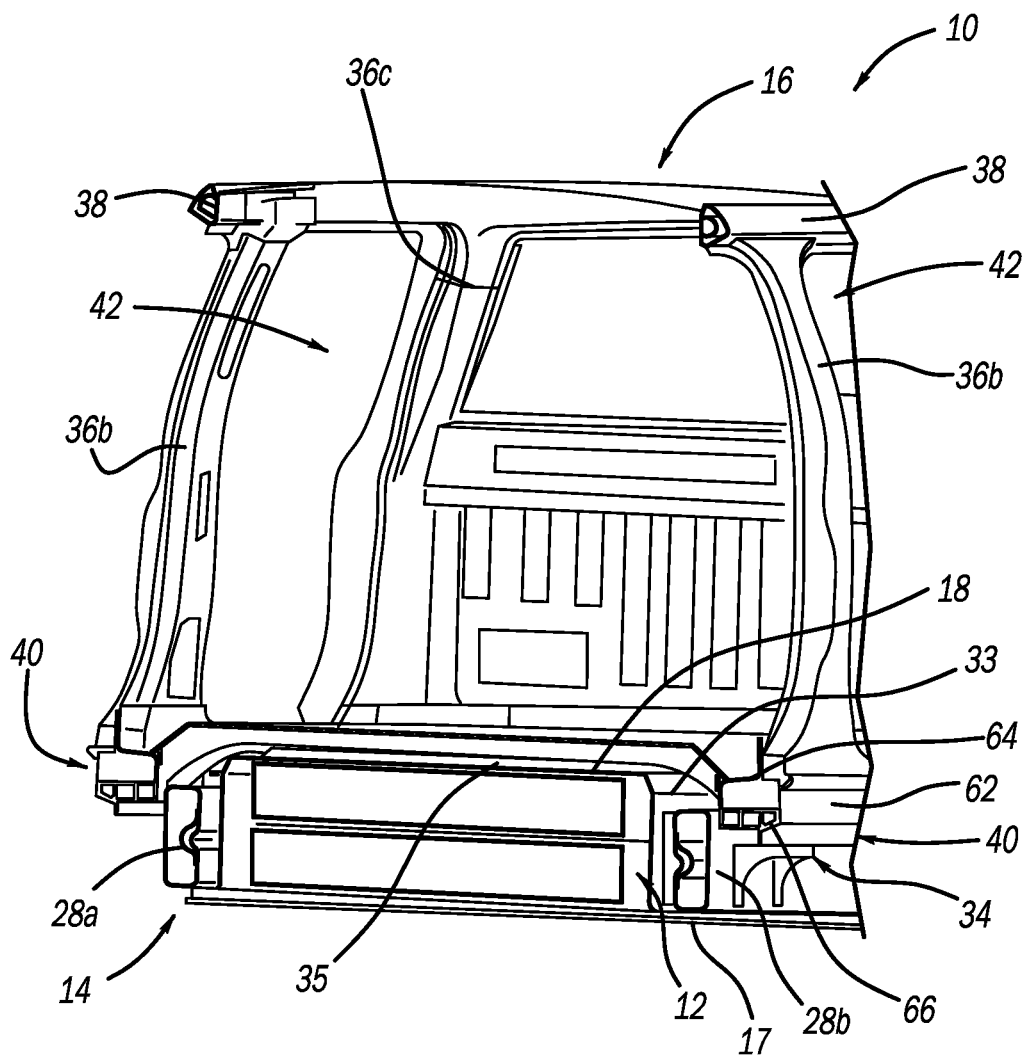
FIG. 2 is a perspective view of a vehicle frame and a vehicle body of the vehicle of FIG. 1.
Figure 3:
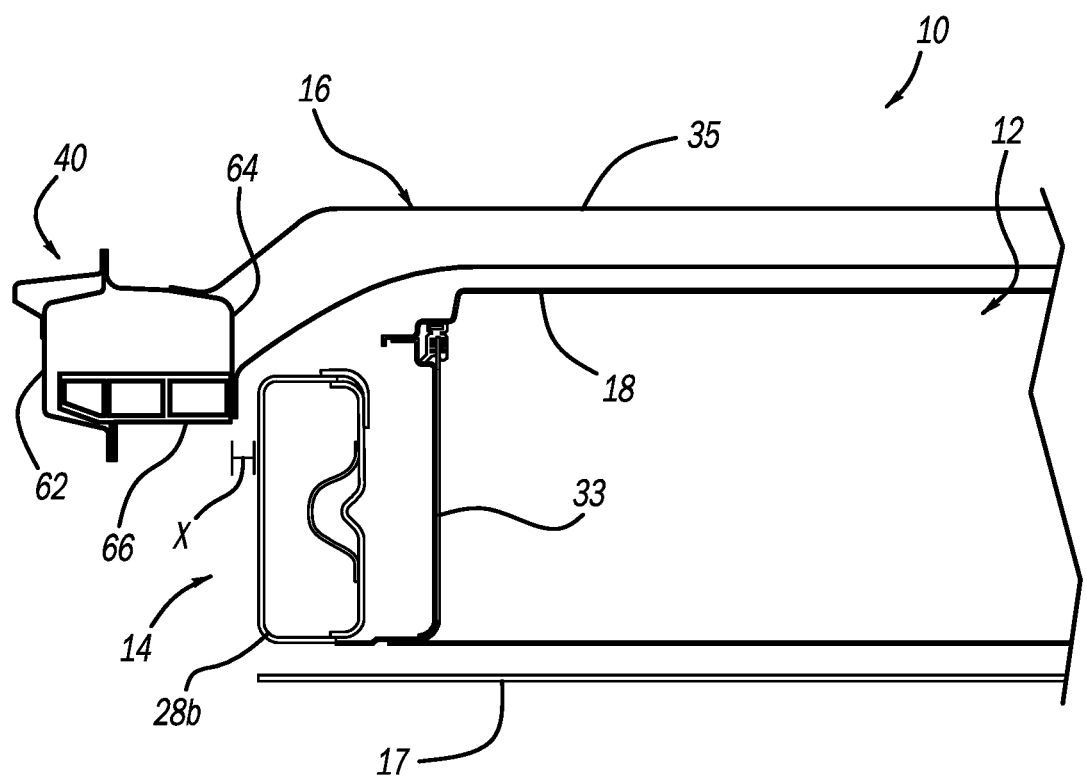
FIG. 3 is a cross-sectional view of a portion of the vehicle frame and the vehicle body of the vehicle of FIG. 1.
Figure 4:
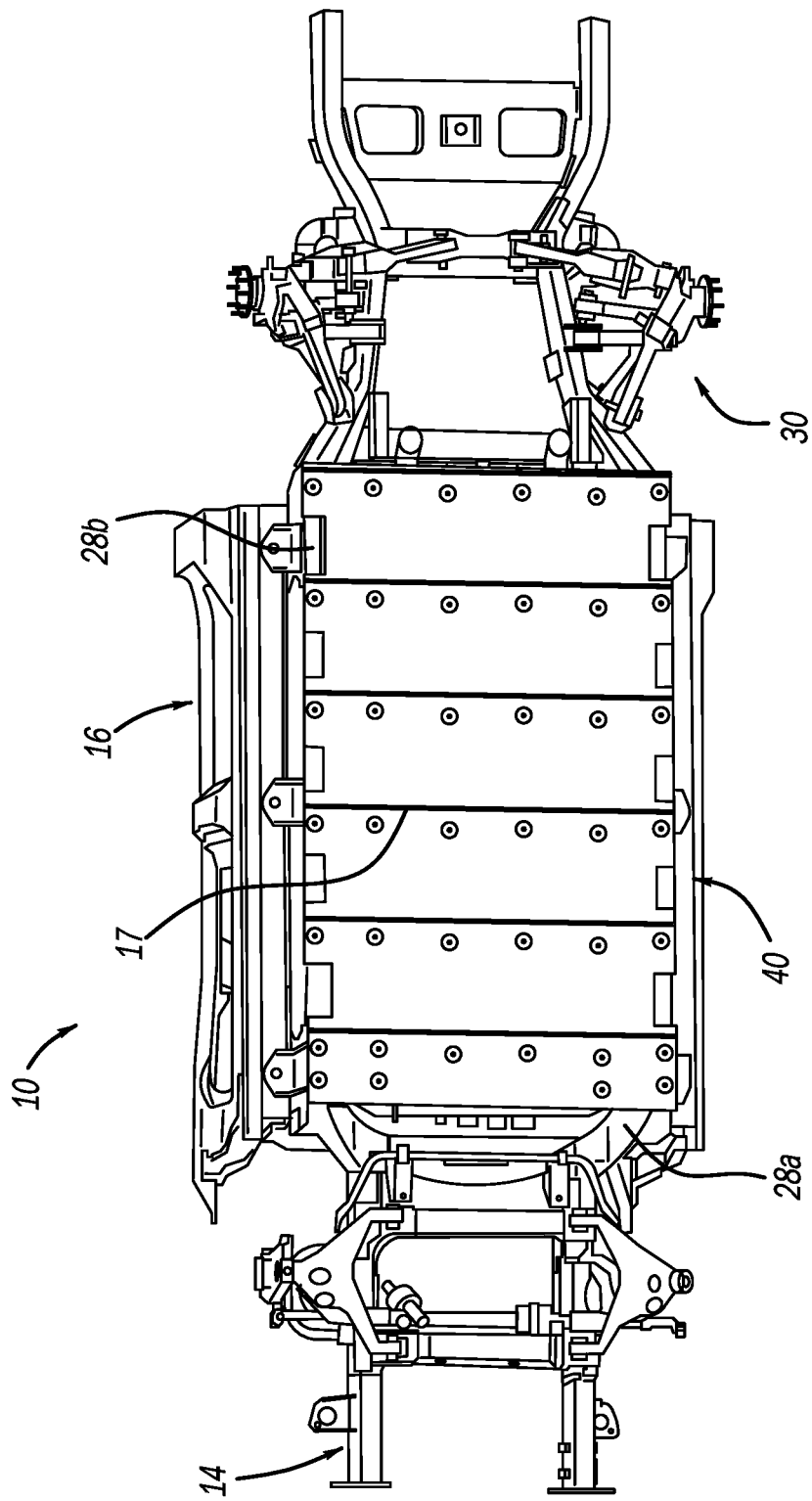
FIG. 4 is a bottom view of the vehicle frame and the vehicle body of the vehicle of FIG. 1.

With reference to FIG. 2, the vehicle body 16 also includes a front end (not shown), a plurality of pillars (e.g., A-pillars (not shown), B-pillars 36b, C-pillars 36c, hinge pillars (not shown)), roof rails 38, and rockers 40. In one example, the front end includes a bumper (not shown), a pair of opposed beams or inner rails (not shown), and a pair of opposed upper rails (not shown). The bumper extends in a transverse direction relative to a longitudinal direction of the vehicle 10 and is secured to front ends of the pair of beams. Each beam extends from a respective hinge pillar to the bumper. Each beam is also arcuate and extends around a front wheel 24a, 24b of the vehicle 10 and forms a portion of a respective front wheel well. The upper rails are positioned above the beams and extend from a respective hinge pillar to a respective beam. The upper rails also form a portion of a respective front wheel well.

The A-pillars, the B-pillars 36b, the hinge pillars, the rockers 40 and the roof rails 38 cooperate to define door openings 42 in the vehicle body 16. Doors (not shown) are rotatably coupled to the hinge pillars between a closed position (not shown) in which the doors are disposed within the door openings 42 and an open position (not shown) in which the doors are removed from the door openings 42.

Each rocker 40 is elongated and extends along the longitudinal direction of the vehicle 10. Each rocker 40 also overlaps a respective opposed longitudinal rail 28a, 28b and is spaced apart from the respective opposed longitudinal rail 28a, 28b by a predetermined distance X (FIG. 3; the predetermined distance X is measured from an inner member 64 of the rocker 40 to the respective opposed longitudinal rail 28a, 28b). In one example, the predetermined distance X may be less than or equal to 19 millimeters (mm). Each opposed longitudinal rail 28a, 28b is located between a respective rocker 40 and the outer support frame 18 of the battery structure 12. A front end of the rocker 40 is housed within and secured to a respective hinge pillar (i.e., the front end of the rocker 40 is disposed within a cavity of the respective hinge pillar).

The rocker 40 includes an outer member 62, the inner member 64, and an inner rocker 66. The outer member 62 is secured to the inner member 64 via welding. In some configurations, the outer member 62 is secured to the inner member 64 with mechanical fasteners. The cross members 35 extend from the inner member 64. The inner rocker 66 is housed within a cavity formed via the outer and inner members 62, 64, and extends along an inboard portion of the outer member 62.

Figure 6:
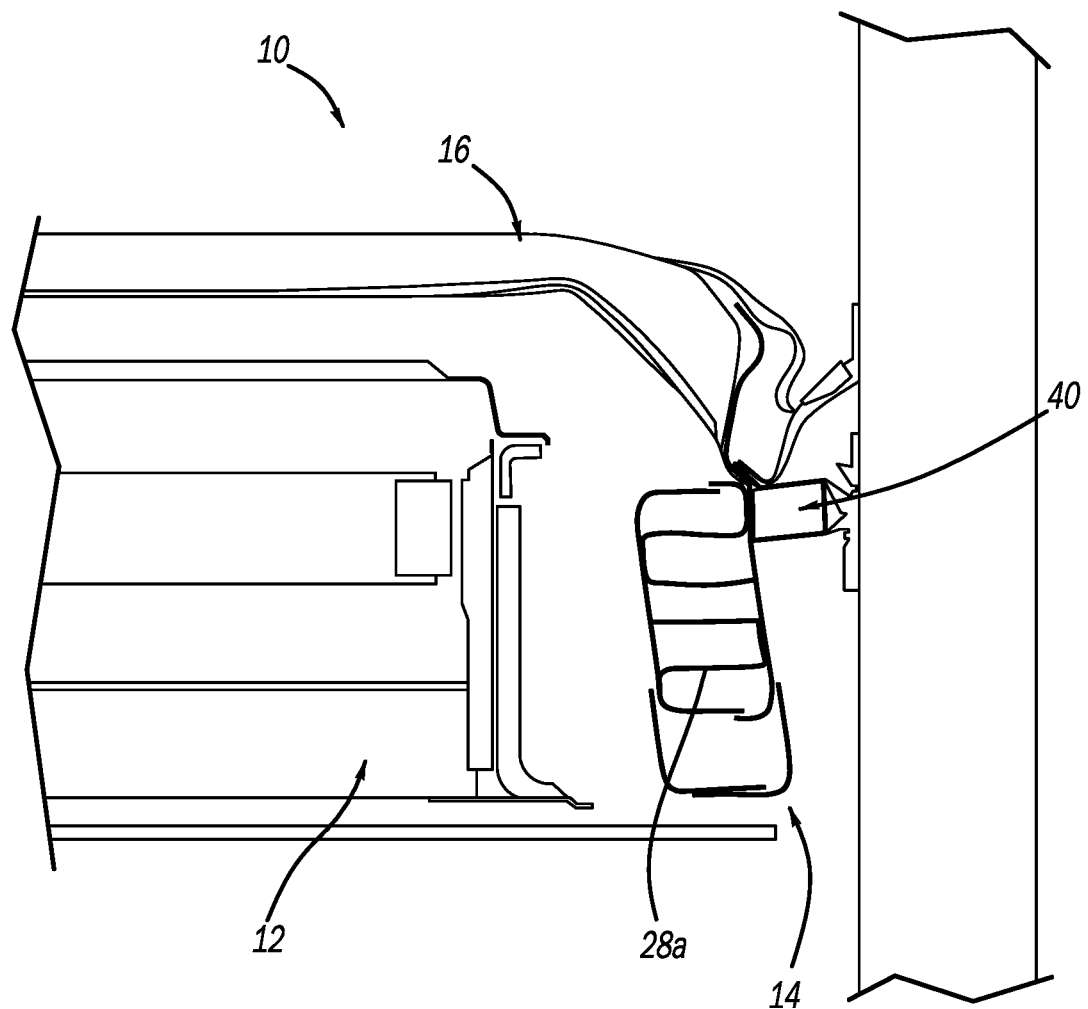
FIG. 6 is a cross-sectional view of a portion of the vehicle of FIG. 1 during an impact event.

A structural assembly of the present disclosure comprises the vehicle frame 14 and the vehicle body 16. The rockers 40 being a predetermined distance from the respective opposed longitudinal rail 28a, 28b and overlapping the respective opposed longitudinal rail 28a, 28b provides improved load paths for distributing loads during a vehicle impact event. For example, as shown in FIG. 6, the structural assembly distributes the loads from the rockers 40 to the respective opposed longitudinal rail 28a, 28b during the impact event. In this way, the vehicle body 16 is inhibited from being displaced relative to the vehicle frame 14. Further, the rockers 40 engaging the respective opposed longitudinal rail 28a, 28b provides energy absorption at any position along the length of the rockers 40.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A structural assembly for a vehicle including a battery structure having an outer support frame, the structural assembly comprising:
 a vehicle frame having opposed longitudinal rails; and a vehicle body distinct from and mounted on the vehicle frame, the vehicle body including opposed rockers extending in a longitudinal direction of the vehicle, each opposed longitudinal rail located between a respective opposed rocker and the outer support frame of the battery structure, wherein the opposed longitudinal rails are spaced apart from the opposed rockers by a predetermined distance and, during a certain impact event, the respective opposed rocker is configured to engage with a respective opposed longitudinal rail to inhibit the vehicle body from being displaced relative to the vehicle frame.

2. The structural assembly of claim 1, wherein the rockers overlap outboard sides of the opposed longitudinal rails.

3. The structural assembly of claim 1, wherein the predetermined distance is less than or equal to 19 millimeters.

4. The structural assembly of claim 1, further comprising:
a plurality of mounts secured to a respective opposed longitudinal rail; and
a plurality of jounce bumpers, each jounce bumper disposed on a respective mount and between the respective mount and the vehicle body.

5. The structural assembly of claim 1, further comprising a vehicle suspension system secured to the vehicle frame and a wheel of the vehicle.

6. The structural assembly of claim 1, wherein the vehicle body includes cross members extending above the opposed longitudinal rails and the battery structure.

7. The structural assembly of claim 1, wherein the vehicle frame is made of steel.

8. The structural assembly of claim 1, wherein the vehicle frame does not include cross members at or near a center portion of the vehicle frame.

9. The structural assembly of claim 1, wherein the opposed longitudinal rails are spaced apart from a respective side of the outer support frame.

10. A structural assembly for a vehicle including a battery structure having an outer support frame, the structural assembly comprising:
a vehicle frame having opposed longitudinal rails; and
a vehicle body distinct from and mounted on the vehicle frame, the vehicle body including opposed rockers extending in a longitudinal direction of the vehicle, each opposed longitudinal rail located between a respective opposed rocker and the outer support frame of the battery structure,
wherein the rockers overlap the opposed longitudinal rails, and
wherein the opposed longitudinal rails are spaced apart from the opposed rockers by a predetermined distance and, during a certain impact event, the respective opposed rocker is configured to engage with a respective opposed longitudinal rail to inhibit the vehicle body from being displaced relative to the vehicle frame.

11. The structural assembly of claim 10, wherein the predetermined distance is less than or equal to 19 millimeters.

12. The structural assembly of claim 10, further comprising:
a plurality of mounts secured to a respective opposed longitudinal rail; and
a plurality of jounce bumpers, each jounce bumper disposed on a respective mount and between the respective mount and the vehicle body.

13. The structural assembly of claim 10, further comprising a vehicle suspension secured to the vehicle frame and a wheel of the vehicle.

14. The structural assembly of claim 13, wherein the vehicle frame is made of steel.

15. The structural assembly of claim 10, wherein the opposed longitudinal rails are spaced apart from a respective side of the outer support frame.

16. The structural assembly of claim 10, wherein the vehicle body includes cross members extending above the opposed longitudinal rails and the battery structure.

17. An electric vehicle comprising:
a battery structure having an outer support frame;
a vehicle frame having opposed longitudinal rails;
a vehicle suspension system secured to the vehicle frame and a respective wheel of the vehicle; and
a vehicle body distinct from and mounted on the vehicle frame, the vehicle body not including cross members at or near a center portion thereof and including opposed rockers extending in a longitudinal direction of the vehicle, each opposed longitudinal rail located between a respective opposed rocker and the outer support frame of the battery structure,
wherein the rockers overlap an upper, outboard portion of the opposed longitudinal rails,
wherein the opposed longitudinal rails are spaced apart from the opposed rockers by a predetermined distance and, during a certain impact event, the respective opposed rocker is configured to engage with a respective opposed longitudinal rail to inhibit the vehicle body from being displaced relative to the vehicle frame.

18. The structural assembly of claim 17, wherein the vehicle frame is made of steel.

* * * * *